US008195205B2

(12) United States Patent
Johnson, Jr. et al.

(10) Patent No.: US 8,195,205 B2
(45) Date of Patent: Jun. 5, 2012

(54) GATEWAY APPLICATION TO SUPPORT USE OF A SINGLE INTERNET ADDRESS DOMAIN FOR ROUTING MESSAGES TO MULTIPLE MULTIMEDIA MESSAGE SERVICE CENTERS

(75) Inventors: Carle S. Johnson, Jr., Annapolis, MD (US); Mike Dewey, Arnold, MD (US); Nikhil Bhadange, Alexandria, VA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 302 days.

(21) Appl. No.: 10/959,187

(22) Filed: Oct. 7, 2004

(65) Prior Publication Data
US 2005/0249150 A1 Nov. 10, 2005

Related U.S. Application Data

(60) Provisional application No. 60/568,257, filed on May 6, 2004, provisional application No. 60/568,258, filed on May 6, 2004.

(51) Int. Cl.
H04W 4/00 (2009.01)
H04L 12/58 (2006.01)
(52) U.S. Cl. ............... 455/466; 455/412.1; 370/328; 370/338; 370/396; 370/352
(58) Field of Classification Search ............ 455/466, 455/412; 370/328, 338, 396, 352
See application file for complete search history.

(56) References Cited

U.S. PATENT DOCUMENTS

| | | | |
|---|---|---|---|
| 1,103,073 A | 7/1914 | O'Connell | 200/19.01 |
| 3,920,908 A | 11/1975 | Kraus | 379/91.02 |
| 4,310,726 A | 1/1982 | Asmuth | 379/207.15 |
| 4,399,330 A | 8/1983 | Kuenzel | 455/456.1 |
| 4,494,119 A | 1/1985 | Wimbush | 342/457 |
| 4,651,156 A | 3/1987 | Martinez | 342/457 |
| 4,680,785 A | 7/1987 | Akiyama et al. | 340/7.21 |
| 4,706,275 A | 11/1987 | Kamil | 379/114.2 |
| 4,725,719 A | 2/1988 | Oncken et al. | 235/487 |
| 4,756,020 A | 7/1988 | Fodale | 379/114.14 |
| 4,776,000 A | 10/1988 | Parienti | 455/407 |
| 4,776,003 A | 10/1988 | Harris | 455/407 |
| 4,776,037 A | 10/1988 | Rozanski, Jr. | 455/166.2 |
| 4,831,647 A | 5/1989 | D'Avello et al. | 455/408 |
| 4,852,149 A | 7/1989 | Zwick et al. | 379/88.01 |
| 4,852,155 A | 7/1989 | Barraud | 379/145 |
| 4,860,341 A | 8/1989 | D'Avello et al. | 455/409 |

(Continued)

FOREIGN PATENT DOCUMENTS
GB 2308528 6/1999
(Continued)

OTHER PUBLICATIONS

International Search Report in PCT/US2005/15667 dated Oct. 20, 2008.
Newsletter "Sonera Bill Warning" Digital Cellular Report. Stevenage: Jun. 17, 1998. vol. 4, Iss.; p. 1.

(Continued)

Primary Examiner — Wen Huang
(74) Attorney, Agent, or Firm — William H. Bollman

(57) ABSTRACT

Wireless carrier networks can utilize multiple MMSCs all accessed by a message sender with a message addressed to a single Internet domain, providing a single point of entry for messages into the network of MMSCs and maintaining routing information sufficient to route messages to all subscribers via the MMSC.

11 Claims, 3 Drawing Sheets

U.S. PATENT DOCUMENTS

| | | | |
|---|---|---|---|
| 4,891,638 A | 1/1990 | Davis | 340/7.42 |
| 4,891,650 A | 1/1990 | Sheffer | 342/457 |
| 4,901,340 A | 2/1990 | Parker et al. | 455/432.3 |
| 4,935,956 A | 6/1990 | Hellwarth et al. | 379/144.02 |
| 4,952,928 A | 8/1990 | Carroll et al. | 340/10.41 |
| 5,003,585 A | 3/1991 | Richer | 379/114.18 |
| 5,014,206 A | 5/1991 | Scribner et al. | 701/207 |
| 5,043,736 A | 8/1991 | Darnell et al. | 342/357.1 |
| 5,046,088 A | 9/1991 | Margulies | 379/211.02 |
| 5,055,851 A | 10/1991 | Sheffer | 342/457 |
| 5,063,588 A | 11/1991 | Patsiokas et al. | 340/7.1 |
| 5,068,656 A | 11/1991 | Sutherland | 340/989 |
| 5,068,891 A | 11/1991 | Marshall | 379/91.02 |
| 5,070,329 A | 12/1991 | Jasinaki | 340/7.27 |
| 5,081,667 A | 1/1992 | Drori et al. | 455/404.1 |
| 5,103,449 A | 4/1992 | Jolissaint | 370/384 |
| 5,119,104 A | 6/1992 | Heller | 342/450 |
| 5,127,040 A | 6/1992 | D'Avello et al. | 455/419 |
| 5,128,938 A | 7/1992 | Borras | 370/311 |
| 5,138,648 A | 8/1992 | Palomeque et al. | 379/22 |
| 5,138,650 A | 8/1992 | Stahl et al. | 455/408 |
| 5,144,283 A | 9/1992 | Arens et al. | 340/506 |
| 5,144,649 A | 9/1992 | Zicker et al. | 455/409 |
| 5,159,625 A | 10/1992 | Zicker | 455/432.1 |
| 5,161,180 A | 11/1992 | Chavous | 379/45 |
| 5,177,478 A | 1/1993 | Wagai et al. | 340/7.4 |
| 5,187,710 A | 2/1993 | Chau et al. | 370/524 |
| 5,193,215 A | 3/1993 | Olmer | 455/521 |
| 5,208,756 A | 5/1993 | Song | 455/456.3 |
| 5,214,789 A | 5/1993 | George | 455/440 |
| 5,216,703 A | 6/1993 | Roy | 455/417 |
| 5,218,367 A | 6/1993 | Sheffer et al. | 342/457 |
| 5,220,593 A | 6/1993 | Zicker et al. | 455/407 |
| 5,223,844 A | 6/1993 | Mansell et al. | 342/357.07 |
| 5,233,642 A | 8/1993 | Renton | 455/405 |
| 5,239,570 A | 8/1993 | Koster et al. | 379/45 |
| 5,265,155 A | 11/1993 | Castro | 379/114.2 |
| 5,265,630 A | 11/1993 | Hartmann | 134/95.1 |
| 5,266,944 A | 11/1993 | Carroll et al. | 340/825.36 |
| 5,274,802 A | 12/1993 | Altine | 707/202 |
| 5,276,444 A | 1/1994 | McNair | 340/5.8 |
| 5,289,527 A | 2/1994 | Tiedemann, Jr. | 455/435.1 |
| 5,291,543 A | 3/1994 | Freese et al. | 455/408 |
| 5,293,642 A | 3/1994 | Lo | 455/456.2 |
| 5,297,189 A | 3/1994 | Chabernaud | 455/461 |
| 5,299,132 A | 3/1994 | Wortham | 455/457 |
| 5,301,223 A | 4/1994 | Amadon et al. | 455/409 |
| 5,301,234 A | 4/1994 | Mazziotto et al. | 380/247 |
| 5,309,501 A | 5/1994 | Kozik et al. | 455/410 |
| 5,311,572 A | 5/1994 | Friedes et al. | 379/211.02 |
| 5,321,735 A | 6/1994 | Breeden et al. | 455/406 |
| 5,325,302 A | 6/1994 | Izidon et al. | 701/301 |
| 5,325,418 A | 6/1994 | McGregor et al. | 455/408 |
| 5,327,144 A | 7/1994 | Stilp et al. | 342/457 |
| 5,329,578 A | 7/1994 | Brennan et al. | 379/211.03 |
| 5,334,974 A | 8/1994 | Simms et al. | 340/990 |
| 5,339,352 A | 8/1994 | Armstrong et al. | 455/417 |
| 5,341,410 A | 8/1994 | Aron et al. | 455/410 |
| 5,341,414 A | 8/1994 | Popke | 379/142.14 |
| 5,343,493 A | 8/1994 | Karimullah | 375/130 |
| 5,347,568 A | 9/1994 | Moody et al. | 379/45 |
| 5,351,235 A | 9/1994 | Lahtinen | 370/259 |
| 5,353,335 A | 10/1994 | D'Urso et al. | 379/114.2 |
| 5,359,182 A | 10/1994 | Schilling | 235/380 |
| 5,359,642 A | 10/1994 | Castro | 379/121.01 |
| 5,359,643 A | 10/1994 | Gammino | 379/143 |
| 5,361,212 A | 11/1994 | Class et al. | 701/16 |
| 5,363,425 A | 11/1994 | Mufti et al. | 379/201.06 |
| 5,369,699 A | 11/1994 | Page et al. | 379/38 |
| 5,374,936 A | 12/1994 | Feng | 342/457 |
| 5,379,451 A | 1/1995 | Nakagoshi et al. | 455/435.1 |
| 5,381,338 A | 1/1995 | Wysocki et al. | 701/207 |
| 5,384,825 A | 1/1995 | Dillard et al. | 455/564 |
| 5,387,993 A | 2/1995 | Heller et al. | 398/151 |
| 5,388,147 A | 2/1995 | Grimes | 455/404.2 |
| 5,390,339 A | 2/1995 | Bruckert et al. | 455/440 |
| 5,394,158 A | 2/1995 | Chia | 342/457 |
| 5,396,227 A | 3/1995 | Carroll et al. | 340/825.36 |
| 5,396,545 A | 3/1995 | Nair et al. | 379/91.01 |
| 5,396,558 A | 3/1995 | Ishiguro et al. | 705/67 |
| 5,398,190 A | 3/1995 | Wortham | 455/456.3 |
| 5,404,580 A | 4/1995 | Simpson et al. | 455/558 |
| 5,406,614 A | 4/1995 | Hara | 455/435.3 |
| 5,408,513 A | 4/1995 | Busch et al. | 455/558 |
| 5,408,519 A | 4/1995 | Pierce et al. | 379/88.17 |
| 5,408,682 A | 4/1995 | Ranner et al. | 455/166.2 |
| 5,412,726 A | 5/1995 | Nevoux et al. | 380/249 |
| 5,418,537 A | 5/1995 | Bird | 342/357.09 |
| 5,423,076 A | 6/1995 | Westergren et al. | 455/86 |
| 5,432,841 A | 7/1995 | Rimer | 455/457 |
| 5,434,789 A | 7/1995 | Fraker et al. | 473/407 |
| 5,438,615 A | 8/1995 | Moen | 379/114.23 |
| 5,440,621 A | 8/1995 | Castro | 379/114.2 |
| 5,454,024 A | 9/1995 | Lebowitz | 379/40 |
| 5,457,737 A | 10/1995 | Wen | 455/410 |
| 5,461,390 A | 10/1995 | Hoshen | 342/419 |
| 5,465,289 A | 11/1995 | Kennedy, Jr. | 455/424 |
| 5,469,497 A | 11/1995 | Pierce et al. | 379/114.17 |
| 5,470,233 A | 11/1995 | Fruchterman et al. | 434/112 |
| 5,479,408 A | 12/1995 | Will | 370/313 |
| 5,479,482 A | 12/1995 | Grimes | 455/556.1 |
| 5,485,161 A | 1/1996 | Vaughn | 342/357.13 |
| 5,485,163 A | 1/1996 | Singer et al. | 342/457 |
| 5,485,505 A | 1/1996 | Norman et al. | 455/419 |
| 5,488,563 A | 1/1996 | Chazelle et al. | 701/301 |
| 5,494,091 A | 2/1996 | Freeman et al. | 152/517 |
| 5,497,149 A | 3/1996 | Fast | 340/988 |
| 5,502,761 A | 3/1996 | Duncan et al. | 379/142.01 |
| 5,506,893 A | 4/1996 | Buscher et al. | 379/115.02 |
| 5,508,931 A | 4/1996 | Snider | 701/207 |
| 5,509,056 A | 4/1996 | Ericsson et al. | 379/114.15 |
| 5,513,243 A | 4/1996 | Kage | 455/456.4 |
| 5,515,287 A | 5/1996 | Hakoyama et al. | 701/301 |
| 5,517,555 A | 5/1996 | Amadon et al. | 455/408 |
| 5,517,559 A | 5/1996 | Hayashi et al. | 379/115.01 |
| 5,519,403 A | 5/1996 | Bickley et al. | 342/352 |
| 5,532,690 A | 7/1996 | Hertel | 340/989 |
| 5,535,434 A | 7/1996 | Siddoway et al. | 455/575.1 |
| 5,539,398 A | 7/1996 | Hall et al. | 340/907 |
| 5,543,776 A | 8/1996 | L'Esperance et al. | 340/426.25 |
| 5,550,897 A | 8/1996 | Seiderman | 455/558 |
| 5,552,772 A | 9/1996 | Janky et al. | 340/573.4 |
| 5,555,286 A | 9/1996 | Tendler | 455/404.2 |
| 5,568,119 A | 10/1996 | Schipper et al. | 340/825.37 |
| 5,570,416 A | 10/1996 | Kroll | 379/114.01 |
| 5,574,648 A | 11/1996 | Pilley | 701/120 |
| 5,577,100 A | 11/1996 | McGregor et al. | 455/406 |
| 5,579,372 A | 11/1996 | Åstrom | 455/412.1 |
| 5,579,376 A | 11/1996 | Kennedy et al. | 455/411 |
| 5,583,918 A | 12/1996 | Nakagawa | 455/409 |
| 5,586,175 A | 12/1996 | Hogan et al. | 379/114.14 |
| 5,588,009 A | 12/1996 | Will | 714/749 |
| 5,592,535 A | 1/1997 | Klotz | 455/406 |
| 5,604,486 A | 2/1997 | Lauro et al. | 340/10.3 |
| 5,606,313 A | 2/1997 | Allen et al. | 340/10.31 |
| 5,606,850 A | 3/1997 | Nakamura | 56/10.2 A |
| 5,610,815 A | 3/1997 | Gudat et al. | 701/23 |
| 5,610,972 A | 3/1997 | Emery et al. | 455/445 |
| 5,614,890 A | 3/1997 | Fox | 340/5.81 |
| 5,615,116 A | 3/1997 | Gudat et al. | 701/23 |
| 5,621,793 A | 4/1997 | Bednarek et al. | 380/240 |
| 5,625,669 A | 4/1997 | McGregor et al. | 455/418 |
| 5,628,051 A | 5/1997 | Salin | 455/433 |
| 5,633,912 A | 5/1997 | Tsoi | 455/566 |
| 5,640,447 A | 6/1997 | Fonseca | 379/114.18 |
| 5,682,600 A | 10/1997 | Salin | 455/422.1 |
| 5,722,067 A | 2/1998 | Fougnies et al. | 455/406 |
| 5,732,346 A | 3/1998 | Lazaridis et al. | 455/406 |
| 5,740,534 A | 4/1998 | Ayerst et al. | 340/7.42 |
| 5,754,636 A | 5/1998 | Bayless | |
| 5,758,088 A | 5/1998 | Bezaire et al. | 709/232 |
| 5,767,795 A | 6/1998 | Schaphorst | 340/988 |
| 5,768,509 A | 6/1998 | Gunluk | 709/203 |
| 5,774,533 A | 6/1998 | Patel | 379/127.03 |
| 5,778,313 A | 7/1998 | Fougnies | 455/406 |
| 5,787,357 A | 7/1998 | Salin | 455/466 |
| 5,790,636 A | 8/1998 | Marshall | 379/88.19 |

| Patent | Kind | Date | Inventor | Class |
|---|---|---|---|---|
| 5,793,859 | A | 8/1998 | Matthews | 379/211.03 |
| 5,794,142 | A | 8/1998 | Vanttila et al. | 455/419 |
| 5,797,094 | A | 8/1998 | Houde et al. | 455/412 |
| 5,797,096 | A | 8/1998 | Lupien et al. | 455/433 |
| 5,802,492 | A | 9/1998 | DeLorme et al. | 455/456.5 |
| 5,806,000 | A | 9/1998 | Vo et al. | 455/466 |
| 5,815,816 | A | 9/1998 | Isumi | 455/458 |
| 5,822,700 | A | 10/1998 | Hult et al. | 455/466 |
| 5,826,185 | A | 10/1998 | Wise et al. | 455/405 |
| 5,828,740 | A | 10/1998 | Khuc et al. | 379/114.2 |
| 5,850,599 | A | 12/1998 | Seiderman | 455/406 |
| 5,854,975 | A | 12/1998 | Fougnies et al. | 455/408 |
| 5,856,974 | A | 1/1999 | Gervais | |
| 5,903,726 | A | 5/1999 | Donovan et al. | 709/206 |
| 5,905,736 | A | 5/1999 | Ronen et al. | 370/546 |
| 5,920,821 | A | 7/1999 | Seazholtz et al. | 455/466 |
| 5,930,701 | A | 7/1999 | Skog | 455/415 |
| 5,940,755 | A | 8/1999 | Scott | 455/426.1 |
| 5,941,945 | A | 8/1999 | Aditham | |
| 5,943,399 | A | 8/1999 | Bannister et al. | 379/88.17 |
| 5,946,629 | A | 8/1999 | Sawyer et al. | 455/466 |
| 5,946,630 | A | 8/1999 | Willars et al. | 455/466 |
| 5,950,130 | A | 9/1999 | Coursey | 455/432.1 |
| 5,953,398 | A | 9/1999 | Hill | 379/121.04 |
| 5,959,543 | A | 9/1999 | LaPorta | |
| 5,963,864 | A | 10/1999 | O'Neil | |
| 5,974,054 | A | 10/1999 | Couts et al. | 370/470 |
| 5,974,133 | A | 10/1999 | Fleischer et al. | 379/230 |
| 5,978,685 | A | 11/1999 | Laiho | 455/466 |
| 5,983,091 | A | 11/1999 | Rodriguez | 455/405 |
| 5,987,323 | A | 11/1999 | Huotari | 455/433 |
| 5,998,111 | A | 12/1999 | Abe | 430/458 |
| 5,999,811 | A | 12/1999 | Molne | 455/432.3 |
| 6,023,470 | A | 2/2000 | Lee | |
| 6,026,292 | A | 2/2000 | Coppinger | |
| 6,029,062 | A | 2/2000 | Hanson | 455/408 |
| 6,035,025 | A | 3/2000 | Hanson | 379/114.2 |
| 6,049,710 | A | 4/2000 | Nilsson | 455/409 |
| 6,058,300 | A | 5/2000 | Hanson | 455/406 |
| 6,064,875 | A | 5/2000 | Morgan | 455/410 |
| 6,070,067 | A | 5/2000 | Nguyen et al. | 455/407 |
| 6,075,982 | A | 6/2000 | Donovan et al. | 455/406 |
| 6,081,508 | A | 6/2000 | West et al. | 370/238 |
| 6,101,378 | A | 8/2000 | Barabash et al. | 455/406 |
| 6,115,458 | A | 9/2000 | Taskett | 379/114.2 |
| 6,122,503 | A | 9/2000 | Daly | 455/419 |
| 6,122,510 | A | 9/2000 | Granberg | 455/433 |
| 6,122,520 | A | 9/2000 | Want et al. | 455/456.2 |
| 6,134,432 | A | 10/2000 | Holmes | |
| 6,138,158 | A | 10/2000 | Boyle | |
| 6,144,653 | A | 11/2000 | Persson et al. | 370/337 |
| 6,148,197 | A | 11/2000 | Bridges et al. | 455/432.3 |
| 6,148,198 | A | 11/2000 | Anderson et al. | 455/432.1 |
| 6,149,353 | A | 11/2000 | Nilsson | 455/409 |
| 6,157,823 | A | 12/2000 | Fougnies et al. | 455/406 |
| 6,157,831 | A | 12/2000 | Lamb | 455/433 |
| 6,169,891 | B1 | 1/2001 | Gorham et al. | 455/408 |
| 6,173,181 | B1 | 1/2001 | Losh | 455/434 |
| 6,181,935 | B1 | 1/2001 | Gossman et al. | 455/433 |
| 6,188,752 | B1 | 2/2001 | Lesley | 379/114.16 |
| 6,208,870 | B1 | 3/2001 | Lorello | |
| 6,219,669 | B1 | 4/2001 | Haff | |
| 6,226,529 | B1 | 5/2001 | Bruno et al. | 455/557 |
| 6,246,879 | B1 | 6/2001 | Segura et al. | 455/446 |
| 6,249,680 | B1 | 6/2001 | Wax et al. | 455/456.2 |
| 6,249,744 | B1 | 6/2001 | Morita | 701/213 |
| 6,263,212 | B1 | 7/2001 | Ross et al. | 455/466 |
| 6,263,372 | B1 | 7/2001 | Hogan et al. | 709/237 |
| 6,266,614 | B1 | 7/2001 | Alumbaugh | 701/211 |
| 6,289,095 | B1 | 9/2001 | Buttitta | |
| 6,289,373 | B1 | 9/2001 | Dezonno | 709/206 |
| 6,311,055 | B1 | 10/2001 | Boltz | 455/414.1 |
| 6,317,594 | B1 | 11/2001 | Gossman et al. | 455/414.1 |
| 6,327,479 | B1 | 12/2001 | Mikkola | 455/466 |
| 6,330,600 | B1 | 12/2001 | Matchefts et al. | 709/223 |
| 6,335,968 | B1 | 1/2002 | Malik | 379/114.2 |
| 6,356,630 | B1 | 3/2002 | Cai et al. | 379/144.01 |
| 6,366,961 | B1 | 4/2002 | Subbiah et al. | 709/238 |
| 6,370,242 | B1 | 4/2002 | Speers | |
| 6,373,930 | B1 | 4/2002 | McConnell et al. | 379/114.28 |
| 6,381,316 | B2 | 4/2002 | Joyce et al. | 379/114.2 |
| 6,393,269 | B1 | 5/2002 | Hartmaier et al. | 455/406 |
| 6,396,913 | B1 | 5/2002 | Perkins, III | 379/112.01 |
| 6,397,055 | B1 | 5/2002 | McHenry et al. | 455/408 |
| 6,408,177 | B1 | 6/2002 | Parikh et al. | 455/414.4 |
| 6,424,841 | B1 | 7/2002 | Gustafsson | 455/466 |
| 6,442,257 | B1 | 8/2002 | Gundlach | 379/114.01 |
| 6,463,145 | B1 | 10/2002 | O'Neal et al. | 379/211.02 |
| 6,470,181 | B1 | 10/2002 | Maxwell | |
| 6,473,622 | B1 | 10/2002 | Meuronen | |
| 6,480,710 | B1 | 11/2002 | Laybourn | |
| 6,483,907 | B1 | 11/2002 | Wong et al. | 379/112.01 |
| 6,490,450 | B1 | 12/2002 | Batni et al. | 455/433 |
| 6,493,430 | B2 | 12/2002 | Leuca | |
| 6,507,589 | B1 | 1/2003 | Ramasubramani et al. | 370/465 |
| 6,529,593 | B2 | 3/2003 | Nelson | 379/114.2 |
| 6,529,732 | B1 | 3/2003 | Vainiomaki et al. | 455/433 |
| 6,538,561 | B2 | 3/2003 | Angus | 340/7.21 |
| 6,560,456 | B1 | 5/2003 | Lohtia et al. | |
| 6,587,688 | B1 | 7/2003 | Chambers et al. | 455/433 |
| 6,587,691 | B1 | 7/2003 | Granstam et al. | 455/456.1 |
| 6,618,763 | B1 | 9/2003 | Steinberg | |
| 6,625,461 | B1 | 9/2003 | Bertacchi | |
| 6,658,260 | B2 | 12/2003 | Knotts | |
| 6,674,767 | B1 | 1/2004 | Kadyk | |
| 6,681,257 | B1 | 1/2004 | Patel | |
| 6,711,411 | B1 | 3/2004 | Ruffini | 455/502 |
| 6,718,178 | B1 | 4/2004 | Sladek et al. | |
| 6,771,971 | B1 | 8/2004 | Smith | 455/456.1 |
| 6,856,804 | B1 | 2/2005 | Ciotta | 455/435.1 |
| 6,886,017 | B1 | 4/2005 | Jackson et al. | |
| 6,915,138 | B2 | 7/2005 | Kraft | |
| 6,956,832 | B1 | 10/2005 | Muhonen et al. | 370/310 |
| 6,987,969 | B1 | 1/2006 | Bruing | |
| 7,010,303 | B2 | 3/2006 | Lewis | |
| 7,058,036 | B1 | 6/2006 | Yu et al. | |
| 7,088,990 | B1 | 8/2006 | Isomursu | |
| 7,116,972 | B1 | 10/2006 | Zhang et al. | 455/414.1 |
| 7,120,418 | B2 | 10/2006 | Herajarvi | |
| 7,154,901 | B2 * | 12/2006 | Chava et al. | 370/401 |
| 7,171,190 | B2 | 1/2007 | Ye | |
| 7,181,538 | B2 * | 2/2007 | Tam et al. | 455/412.2 |
| 7,197,661 | B1 * | 3/2007 | Reynolds et al. | 714/4.4 |
| 7,224,696 | B2 | 5/2007 | Bouleros | |
| 7,318,098 | B2 | 1/2008 | Steinberg | |
| RE40,243 | E | 4/2008 | Leuca | |
| 7,366,529 | B2 | 4/2008 | Alanara | |
| 7,409,428 | B1 * | 8/2008 | Brabec et al. | 709/206 |
| 7,480,915 | B2 | 1/2009 | Costa Requena | |
| 7,486,641 | B2 | 2/2009 | Reddy | |
| 7,509,136 | B2 | 3/2009 | Hart | |
| 7,519,654 | B1 | 4/2009 | Smith | |
| RE40,780 | E | 6/2009 | Leuca | |
| 7,577,431 | B2 | 8/2009 | Jiang | |
| 7,590,225 | B2 | 9/2009 | Sivula | |
| 7,627,305 | B2 | 12/2009 | Helferich | |
| 7,761,511 | B2 | 7/2010 | Kaplan | |
| 7,809,382 | B2 | 10/2010 | Smith | |
| 7,860,068 | B2 | 12/2010 | Smith | |
| 7,890,127 | B2 | 2/2011 | Knotts | |
| 7,991,411 | B2 | 8/2011 | Johnson | |
| 2001/0040949 | A1 | 11/2001 | Blonder et al. | 379/144.01 |
| 2001/0041579 | A1 | 11/2001 | Smith et al. | 455/466 |
| 2002/0103762 | A1 | 8/2002 | Lopez et al. | 705/63 |
| 2003/0040300 | A1 * | 2/2003 | Bodic et al. | 455/412 |
| 2003/0055912 | A1 | 3/2003 | Martin et al. | 709/218 |
| 2003/0092454 | A1 | 5/2003 | Halim | |
| 2003/0105864 | A1 | 6/2003 | Mulligan | |
| 2003/0193967 | A1 * | 10/2003 | Fenton et al. | 370/490 |
| 2004/0196858 | A1 * | 10/2004 | Tsai et al. | 370/401 |
| 2004/0203756 | A1 | 10/2004 | Lin | |
| 2004/0259531 | A1 | 12/2004 | Wood et al. | 455/412.1 |
| 2005/0004968 | A1 | 1/2005 | Mononen | |
| 2005/0064884 | A1 | 3/2005 | Dumont | |
| 2005/0076084 | A1 | 4/2005 | Loughmiller et al. | 709/206 |
| 2005/0132060 | A1 | 6/2005 | Mo | |
| 2005/0141522 | A1 * | 6/2005 | Kadar et al. | 370/396 |
| 2005/0164721 | A1 | 7/2005 | Yeh | |

| | | | |
|---|---|---|---|
| 2005/0176409 | A1 | 8/2005 | Carpenter |
| 2005/0186974 | A1* | 8/2005 | Cai .............................. 455/466 |
| 2006/0053197 | A1* | 3/2006 | Yoshimura et al. ........... 709/206 |
| 2006/0194595 | A1 | 8/2006 | Myllynen |
| 2010/0257241 | A1 | 10/2010 | Hale |

FOREIGN PATENT DOCUMENTS

| | | |
|---|---|---|
| WO | WO97/41654 | 11/1997 |
| WO | PCTSE9800992 | 5/1998 |
| WO | WO9856160 | 12/1998 |
| WO | PCTSE9900875 | 5/1999 |
| WO | PCTFI9900935 | 11/1999 |
| WO | WO9960801 | 11/1999 |
| WO | WO0028746 | 5/2000 |

OTHER PUBLICATIONS

"Technology Rides Control Network to Support Short Package Applications"; Advanced Intelligent Network New. Washington, DC: Mar. 19, 1997. vol. 7, Iss. 6; p. 1.

Cellular Mobile Pricing Structures and Trends; Dr. Sam Paltridge of the OECD's Directorate for Science, Technology and Industry; Dist.: May 19, 2000 (Nov. 1999).

The Power of Mobile Unified Messaging: Siemans and Comverse to Demonstrate WAP-Based Messaging Applications on Live GPRS System, Comverse, Feb. 2000.

* cited by examiner

GATEWAY APPLICATION TO SUPPORT USE OF A SINGLE INTERNET ADDRESS DOMAIN FOR ROUTING MESSAGES TO MULTIPLE MULTIMEDIA MESSAGE SERVICE CENTERS

This application claims priority from U.S. Provisional Application No. 60/568,257, filed May 6, 2004 entitled "Method to Qualify Multimedia Message Context to Enable Use of a Single Internet Address Domain to Send Messages to Both Short Message Service Centers and Multimedia Message Service Centers" to Carle S. Johnson, et al.; and from U.S. Provisional Application No. 60/568,258, filed May 6, 2004 entitled "Gateway Application to Support Use of a Single Internet Address Domain for Routing Messages to Multiple Multimedia Service Centers" to Carle S. Johnson, Jr., et al., the entirety of both of which are expressly incorporated herein by reference.

BACKGROUND OF THE INVENTION

1. Field of the Invention

This invention relates to wireless telecommunications, and in particular to multimedia messaging services (MMS).

2. Background of Related Art

The world has been transformed by the emergence of electronic messaging. Initially, short messaging services (SMS) were developed to allow text messaging. Later, these text capabilities were expanded to include audio and images with multimedia messaging services (MMS).

To send an MMS message, an MMS message file must first be created. The format of an MMS message file is documented in the MMS Encapsulation Protocol specification published by the Open Mobile Association (www.openmobileassociation.org) and/or the WAP Forum (www.wapforum.org). The MMS message file format consists of an MMS message binary header, followed by a multipart MIME message where the multipart message is encoded in a binary multipart format as defined by the WAP Wireless Session Protocol (WSP) specification. This binary MMS message file is stored on a web server using a MIME type of application/vnd.wap.mms-message and an MMS message type of m-retrieve-conf. A subset of the binary MMS header is sent as an MMS notification message (MMS message type m-notification-ind) via SMS to the mobile device together with a URL pointer to the location of the complete message.

MMS (Multimedia Messaging Service) messages are sent using a combination of SMS and Wireless Application Protocol (WAP) technologies. Conventionally, when an MMS message is sent, a mobile device 800 receives an MMS notification message via SMS. When this MMS notification message is received by the mobile device 800, the mobile device 800 either automatically or at user request initiates a WAP gateway connection to download the content of the MMS message.

Messages are delivered from an MMSC to a handset via an MM1 interface, which is normally implemented over a WAP gateway, but may also be delivered via some other proprietary direct IP air interface. MM4 is strictly defined as MMSC to MMSC communication. MM7 is the Value Added Service Provider interface to the MMSC. It is defined as an XML/SOAP API. MM4 and MM7 are not used to communicate to handset devices. MM4 is the MMS standard for connectivity between multiple MMSCs. MM4 is an SMTP based interface where the MMS message is posted to the server as a standard MIME encoded e-mail message. MM1 is the MMS standard for phones to send and receive MMS messages from an MMSC. For information relating to components of the MMS standard, reference should be made to 3 Gpp TS 23.140 v6.5.0 Technical Specification —$3^{rd}$ Generation Partnership Project; Technical Specification Group Terminals; Multimedia Messaging Service (MMS); Functional description; Stage 2 (Release 6).

Moreover, wireless Service Providers (carriers) currently install a single Multimedia Messaging Service Center (MMSC) to support all of their multimedia messaging subscribers. The number of subscribers that the single MMSC can support is limited. In order to support more than one MMSC in the carrier's network, each MMSC must have a unique Internet address. Internet messages must be sent to the explicit mailbox and Internet domain name for a particular MMSC. Thus, multiple MMSCs serving the same network must each be referenced by unique address@domains. This forces the carrier to either rely on a single MMSC, or to publish a different domain for each MMSC deployed. This results in uncertainty for message senders as to which domain messages to any particular subscriber within the network should be addressed.

Carriers providing Multimedia Messaging Services utilize a single MMSC to serve all subscribers in their network OR they require messages to be addressed to the specific domain name of the MMSC hosting the subscriber, resulting in the use of multiple domain names for Multimedia Messaging within a single carrier network.

FIG. 3 depicts the conventional installation of an MMSC and an SMSC in a wireless provider's network.

There are disadvantages with the current technology. For instance, wireless service providers cannot publish a single domain name that can be used to address all of the carriers subscribers. Moreover, wireless service providers are forced to either rely on a single MMSC, or to publish a different domain for each MMSC deployed. Nationwide wireless service providers cannot employ multiple MMSCs to service geographically diverse population centers or to provide geographic redundancy for fault tolerance. Wireless service providers cannot easily integrate Multimedia Message Centers from multiple vendors. Any processing that the carrier wants to apply to Multimedia Messages must be applied at each MMSC. Also, there is no single point of connection for third party service providers to connect to send messages to all subscribers within the carrier's network.

There is a need for techniques and architecture for MMS services which are simpler to implement from a sender's perspective, and which ensure maximum profitability from a carrier's perspective.

SUMMARY OF THE INVENTION

In accordance with the principles of the present invention, a Multimedia Messaging (MMS) gateway comprises MM3 (SMTP), MM4 (MMS Extended SMTP) and MM7 (SOAP) interfaces for connection to an Internet. A plurality of MM3, MM4 and MM7 interfaces connect to a plurality of network Multimedia Messaging Service Centers (MMSCs). A database associates subscribers with a particular MMSC servicing them. A routing module forwards incoming MMS messages to a particular one of a plurality of MMSCs based on information obtained from the database. In this way, messages are sent to subscribers of a plurality of MMSCs using addresses to a single domain name associated with the MMS gateway.

A method of providing a single domain name for Multimedia Messaging (MMS) messages addressed to multiple Multimedia Messaging Service Centers (MMSCs) in a wireless network in accordance with another aspect of the present invention comprises receiving an MMS message through a connection to an Internet intended for a subscriber of one of a plurality of MMSCs. A destination subscriber is associated with a particular one of the plurality of MMSCs servicing them. The received MMS message is forwarded to the particular one of the plurality of MMSCs based on an association of the destination subscriber with the particular one of the plurality of MMSCs. In this way, MMS messages are sent to subscribers of a plurality of MMSCs using addresses to a single domain name.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Benefits of the present invention include the fact that the Multimedia Messaging intelligent gateway 100 provides a single point to apply carrier initiated control processing such as anti-"spam" (unsolicited email) checks and subscriber or carrier defined message manipulation or message blocking by sender address for all messages entering the network. Also, the Multimedia Messaging intelligent gateway 100 provides a store-and-forward capability that prevents message loss in the event that an MMSC is momentarily out of service. Moreover, the message storage facility of the Multimedia Messaging intelligent gateway 100 can be utilized as a central inbox to facilitate Web reporting or to consolidate and accumulate overall network messaging statistics. The present invention also allows for the integration of MMSCs from multiple vendors into a carrier's network.

Another benefit of the present invention is that it allows wireless carrier networks to provide Multimedia Messaging utilizing multiple Multimedia Messaging Service Centers, allowing messages for subscribers of each of the multiple MMSCs to be sent addressed to but a single Internet domain.

In the embodiment of the present invention, the disclosed wireless MMS Gateway (MMSG) Application provides a gateway with a single domain name which connects all MMSCs in a provider's network, provides a single point of entry for messages into the network of MMSCs and maintains routing information sufficient to route messages to all subscribers via the appropriate MMSC.

Exemplary components of the disclosed Multimedia Messaging Service Gateway are:
An MM3 (SMTP), MM4 (MMS Extended SMTP) and MM7 (SOAP) Servers for inbound email
A database containing subscriber tables, routing tables and message storage tables
A message routing engine
MM3 (SMTP), MM4 (MMS Extended SMTP) and MM7 (SOAP) client modules
An optional message input interface to provide a connection mechanism for third party applications.

The Multimedia Messaging Service Gateway (MMSG) is installed in the carrier's network as the primary mail server for wireless MMS messages. All MMS messages for all subscribers handled by all MMSCs in the network are addressed to the subscriber's phone number (the mailbox) at the domain name assigned to the MMSG. (e.g. 4105551212@(mmsq-.com) The MMSG stores the multimedia message in its Message table to provide store-and-forward support. The MMSG then queries its subscriber and routing tables to determine the proper destination MMSC for the destination subscriber. The MMSG routing engine determines the route based on its routing tables and directs the message to the appropriate output module for delivery to the appropriate Multimedia Messaging Service Center.

Figure 1:
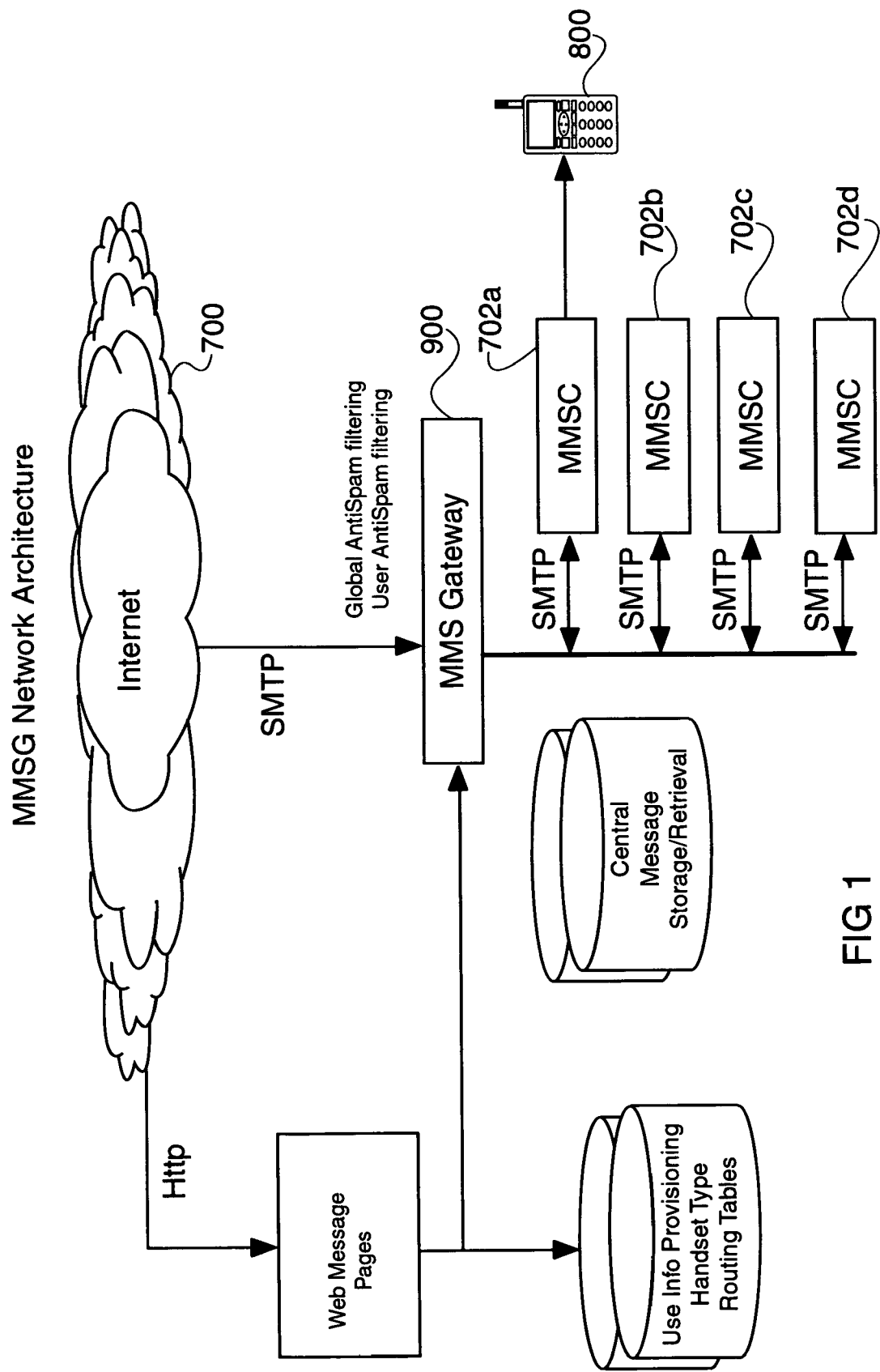
FIG. 1 shows an exemplary MMSG network architecture implementing multiple MMSCs accessed via a single domain name using a multiple MMS gateway, in accordance with another embodiment.

FIG. 1 shows an exemplary MMSG network architecture implementing multiple MMSCs accessed via a single domain name using a multiple MMS gateway, in accordance with another embodiment.

In particular, as shown in FIG. 1, an MMS gateway 900 accepts MMS messages intended for subscribers for any of the carrier's MMSCs 702a-702d. The MMS gateway 900 allows a single addressable point of presence on the Internet (single URL) for subscribers of multiple MMSCs 702a-702d.

Figure 2:
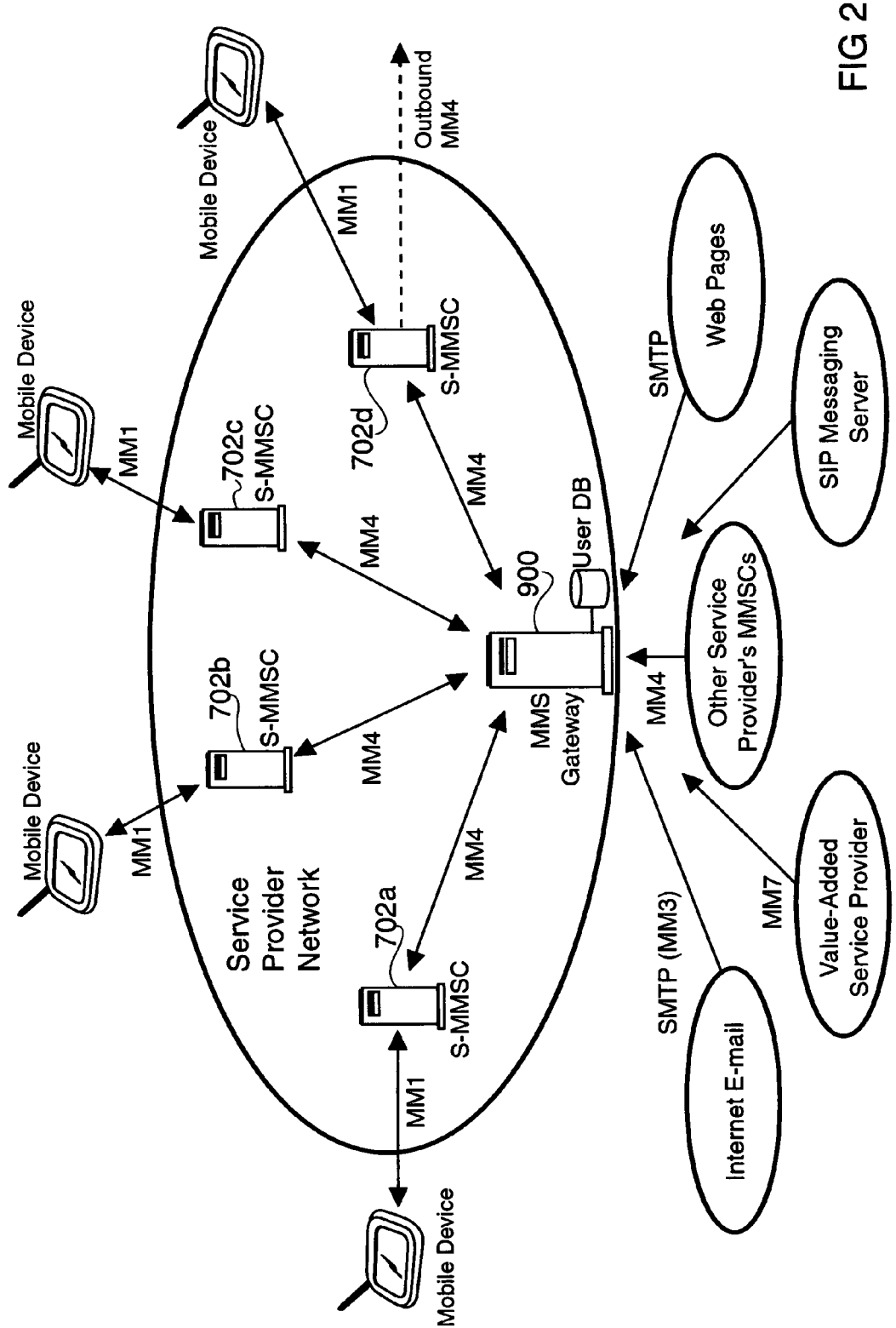
FIG. 2. shows a wireless carrier implementing four MMSCs accessed via a single domain name assigned to a multiple MMS Gateway, in accordance with the embodiment of FIG. 1.
Figure 3:
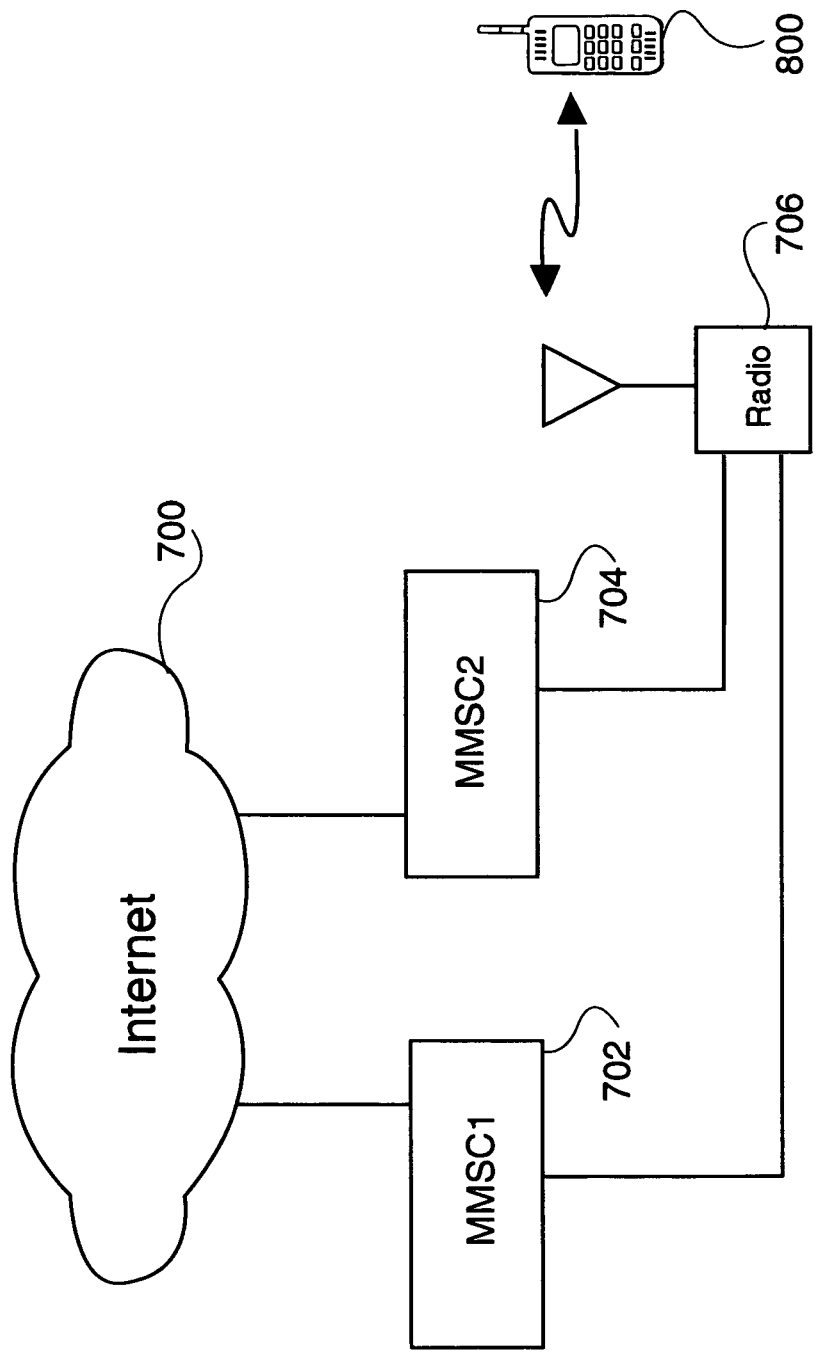
FIG. 3 depicts the conventional installation of an MMSC and an SMSC in a wireless provider's network.

FIG. 2 shows a wireless carrier implementing four MMSCs accessed via a single domain name assigned to a multiple MMS Gateway, in accordance with the embodiment of FIG. 1.

In particular, as shown in FIG. 2, multiple MMSCs 702a-702d are accessed via a single MMS Gateway 900, as also shown in FIG. 1.

The disclosed Multimedia Messaging Gateway 900 provides a single input connection point for Web based "Send an MMS message" pages.

The Multimedia Messaging Gateway 900 also provides a single input connection point for value added third party service providers.

The Multimedia Messaging Gateway 900 also provides a single point to apply carrier-initiated control processing such as anti-"spam" (unsolicited email) checks and subscriber or carrier defined message manipulation or message blocking by sender address for all messages entering the network.

The Multimedia Messaging Gateway 900 also provides a store-and-forward capability that prevents message loss in the event that an MMSC is momentarily out of service.

The message storage facility of the Multimedia Messaging Gateway 900 can be utilized as a central inbox to facilitate Web reporting or to consolidate and accumulate overall network messaging statistics.

The MMS gateway 900 has the inherent capability of integrating MMSCs 702a-702d from multiple vendors. An MMS gateway 900 in accordance with the principles of the present invention also allows a carrier to customize message content and delivery rules on an individual MMSC basis.

The present invention has applicability with all national and international wireless cell phone service providers and/or carriers offering or planning to offer Multimedia Messaging Services. For instance, the invention has particular applicability in replacing stand alone Multimedia Messaging Service Centers.

The envisioned market for the present invention includes all national and international wireless cell phone service providers and/or carriers offering or planning to offer Multimedia Messaging Services (MMS) in conjunction with Short Message Service (SMS).

While the invention has been described with reference to the exemplary embodiments thereof, those skilled in the art will be able to make various modifications to the described embodiments of the invention without departing from the true spirit and scope of the invention.

What is claimed is:

1. A Multimedia Messaging Service (MMS) gateway, comprising:
    an Internet interface;
    at least one Multimedia Messaging Service Center (MMSC) interface to interface said MMS gateway with a plurality of MMSCs;
    an MMSC subscriber database associating a destination subscriber device with a particular servicing MMSC out of said plurality of MMSCs and providing routing information for routing an incoming MMS message to a proper one of said plurality of MMSCs associated with said destination subscriber device; and
    a routing module to forward said incoming MMS message to said proper one of said plurality of MMSCs;
    wherein a single unique domain name associated with said MMS gateway provides a single distribution source for forwarding said incoming MMS message to said proper one of said plurality of MMSCs.

2. The Multimedia Messaging Service (MMS) gateway according to claim 1, further comprising:
    a table in said database defining a particular MMSC to which MMS messages to said particular subscriber are to be forwarded from said MMS gateway.

3. The Multimedia Messaging Service (MMS) gateway according to claim 1, further comprising:
    a single anti-spam filtering function operating on messages intended for each of said plurality of MMSCs.

4. The Multimedia Messaging Service (MMS) gateway according to claim 1, further comprising:
    a store and forward capability that prevents message loss in an event that any of said plurality of MMSCs are momentarily out of service.

5. The Multimedia Messaging Service (MMS) gateway according to claim 1, further comprising:
    a module to facilitate, consolidate, and accumulate overall network messaging statistics for all of said plurality of MMSCs.

6. The Multimedia Messaging Service (MMS) gateway according to claim 1, wherein said said Internet interface comprises:
    an MM3 (SMTP) interface;
    an MM4 (MMS Extended SMTP) interface; and
    an MM7 (SOAP) interface.

7. The Multimedia Messaging Service (MMS) gateway according to claim 1, wherein said at least one MMSC interface for connection to said plurality of MMSCs comprise at least one of:
    an MM3 (SMTP) interface;
    an MM4 (MMS Extended SMTP) interface; and
    an MM7 (SOAP) interface.

8. A method of forwarding Multimedia Messaging Service (MMS) messages, comprising:
    interfacing, with at least one Multimedia Messaging Service Center (MMSC) interface, said MMS gateway to a plurality of MMSCs;
    receiving, at a Multimedia Messaging Service (MMS) gateway between a destination subscriber device and a plurality of Multimedia Messaging Service Centers (MMSCs), an incoming MMS message addressed to said destination subscriber device;
    associating, in an MMSC subscriber database, a destination subscriber device with a particular servicing MMSC out of said plurality of MMSCs, said MMSC subscriber database providing routing information for routing said incoming MMS message to a proper one of said plurality of MMSCs associated with said destination subscriber device; and
    forwarding said incoming MMS message to said proper one of said plurality of MMSCs;
    wherein a single unique domain name associated with said MMS gateway provides a single distribution source for forwarding said incoming MMS message to said proper one of said plurality of MMSCs.

9. The method of forwarding Multimedia Messaging Service (MMS) messages according to claim 8, wherein:
    said domain name is assigned a unique Universal Resource Locator (URL).

10. Apparatus for forwarding Multimedia Messaging Service (MMS) messages, comprising:
    means for interfacing, with at least one Multimedia Messaging Service Center (MMSC) interface, said MMS gateway to a plurality of MMSCs;
    means for receiving, at a Multimedia Messaging Service (MMS) gateway between a destination subscriber device and a plurality of Multimedia Messaging Service Centers (MMSCs), an incoming MMS message addressed to said destination subscriber device;
    means for associating, in an MMSC subscriber database, said destination subscriber device with a particular servicing MMSC out of said plurality of MMSCs, said MMSC subscriber database providing routing information for routing said incoming MMS message to a proper one of said plurality of MMSCs associated with said destination subscriber device; and
    means for forwarding said incoming MMS message to said proper one of said plurality of MMSCs;
    wherein a single unique domain name associated with said MMS gateway provides a single distribution source for forwarding said incoming MMS message to said proper one of said plurality of MMSCs.

11. The apparatus for forwarding Multimedia Messaging Service (MMS) messages according to claim 10, wherein:
    said domain name is assigned a unique Universal Resource Locator (URL).

* * * * *